3,138,462
PROCESS OF MAKING QUICK-COOKING PASTA
Saul N. Katz, Brooklyn, N.Y., and Daniel J. Donovan, Belleville, N.J., assignors to General Foods Corporation, White Plains, N.Y., a corporation of Delaware
No Drawing. Filed Nov. 20, 1961, Ser. No. 153,713
3 Claims. (Cl. 99—85)

The present invention relates to an improved method of making quick-cooking pastas and pasta products.

It has long been an object to produce a quick-cooking pasta similar to the quick-cooking products of the cereal and other related arts. The production of conventional pastas has generally included the classic method of preparing a thick, heavy, difficult to handle starch dough which contains about 70% by weight starch solids and 30% by weight water. This thick dough or paste is then kneaded, extruded, cut, and dried in air to a rigid state after which it is packaged and sold to the consumer. Inherent in such processes and attempts is the use of bulky and expensive equipment to treat the thick starch dough. Aside from the expense of such equipment these processes involve a large amount of solids loss during cooking in an excess of boiling water.

Therefore, it is not very desirable to produce a quick-cooking pasta by a method similar to the conventional process which would employ the step of pre-cooking the formed and dried pasta in an excess of water followed by dehydration to less than 10% moisture. Such a method would merely serve to increase the cost of pasta production by performing the household cook in an excess quantity of water prior to packaging.

If a portion of pre-cooked flour is initially used in the making of the pasta dough, the essential mixing or kneading step will often degrade the cooked starch particles and even greater solids loss will occur during cooking in an excess of water.

It is thus evident that it would be advantageous to produce a pasta product by a more simple and direct means, and especially desirable to produce a pre-cooked pasta by a novel and improved method which eliminates some of the disadvantages inherent in the prior art while at the same time giving a product capable of quick reconstitution in water below boiling as well as at its boiling point. Moreover, such product could be used in a minute-type preparation similar to the instant products of related arts.

It is, therefore, an object of this invention to provide an improved process for preparing pre-cooked pastas which eliminates the bulky and expensive machinery necessary in existing processes.

Another object of this invention is to substantially reduce the starch degradation and solids loss during the manufacture of pre-cooked pastas.

Another object of this invention is to reduce the gelatinization or cooking time for pre-cooked pastas.

Another object of this invention is to provide a pre-cooked pasta product which can be reconstituted in water at moderate temperatures and may be combined with other dehydrated ingredients in a minimum quantity of water to produce a casserole type preparation which may be cooked at normal household oven temperatures.

Another object of this invention is to produce a pasta product of the instant type which can be rehydrated in a minute-type preparation or in water at moderately elevated temperatures, say at 160° to 180° F., to produce a texture and mouth feel equivalent to conventional water-cooked pastas and whereby excessive cooking of the starchy contents of the product can be avoided to thereby provide a product having more substance when eaten.

Briefly described, the present invention involves cooking or gelatinization of a high water content starch slurry prior to extrusion or shaping of the starchy material into a pasta product. The high moisture slurry is formed by blending an ungelatinized starchy material, typically a farina flour such as semolina or durum wheat, with a quantity of water approximating that which is intended to be present in the reconstituted product, e.g. from 60 to 85% by weight of the slurry, and preferably within the range of 68 to 74%. After formation of the high moisture slurry, it is agitated to provide a substantially uniform suspension of the starch particles throughout the water. The starch slurry is then gelatinized by heating above 140° F. and below 212° F. to form a plastic-like hydrated gel of adhering starch granules. This hot plastic-like gel is then shaped or extruded while still at a temperature of above 140° F. into suitable shape for consumption, surface cooled to below at least 80° F., preferably room temperature and further processed to stable form. The product is preferably stabilized by drying in air at moderate temperatures below 212° F., and preferably below 200° F. to slowly remove the gelatinization water without disturbing the gel structure. During drying the gel particles are "set" without puffing or expansion to a relatively rigid condition which is capable of reconstitution due to its properly gelatinized structure within 4 to 8 minutes in hot water as well as boiling water and is, therefore, suitable for use in a minute-type preparation or a casserole ingredient.

Various forms of apparatus may be used in practicing this invention including existing equipment such as simple bakery extruders which may be supplied with heating means. Indeed many types of existing low pressure extruders with built-in heating means may be converted to pasta production according to the process of this invention.

The essential features of this process should be preserved regardless of the apparatus used and therefore gelatinization should be allowed to proceed under low pressure conditions so as to allow gentle formation of the product together with a lack of kneading after formation of the gel. In this manner the proper gel structure will be formed for reconstitution.

Since the essence of this process is to extrude after gelatinization, it is a preferred feature of this invention to cook or gelatinize within the extruding apparatus itself, whereby the gel may then be directly extruded without excessive handling. Moreover, such a process readily adapts itself to continuous production methods. The high moisture slurry may be blended directly above the extruder and fed to the extruder at a rate commensurate with a necessary cooking time. This cooking time is usually about 1 to 3 minutes in order to gelatinize the starch slurry. The cooking means may take any conventional form such as a heating jacket which surrounds the barrel section of the extruder and heats such apparatus by means of hot water, hot oil, steam, electric resistance or other heat transfer medium. The die orifice through which the gelatinized pasta slurry issues should also be heated to above 150° F. to prevent die clogging by premature setting of the starch gel. While a gelatinization temperature range of 140° to 212° F. is practical, it is preferred to gelatinize between 180° to 205° F. for 1 to 3 minutes in order to achieve quick gelatinization and avoid die clogging or excessive cooking of the starch. It is evident that the reduction in cooking time is made possible by the fact that only a predetermined amount of water, namely that necessary to gelatinize the starch, takes part in gelatinization. Therefore, there is no necessity to heat an excess quantity of water which does not actually combine with the starch during the gelatinization or cooking process. Similarly it is evident that there will be no solids loss in the cook water. The actual cooking time will of course vary with the ultimate product desired, the relative volumes of the charge and cooking chamber, the pre-heat temperatures, heat conductance of the charge, and other variables. Regardless of the apparatus used it is essential that cooking or gelatinization be accomplished by using only the specific water content desired in the ultimate gelatinized product.

The low pressure extrusion or shaping of the cooked or gelatinized starch slurry is accomplished at a temperature of above 140° F. in order to prevent extrusion problems such as die clogging due to setting of the gel. Preferably this extrusion temperature is in the range of 175° to 800° F. Higher temperatures above 200° F. sometimes cause excessive cooking of the starch molecules as well as die clogging of the extrusion orifice. In any event the gelatinized slurry must be extruded while it is still in an "unset" state and this state is typically preserved by the use of heating means.

The products of this invention rehydrate in water below, as well as at its boiling point, to give a reconstituted product similar in all respects to conventional cooked pastas within 4 to 8 minutes of cooking time. The products rehydrate easily in water having a temperature of 160° to 180° F. The products are white in color with a rubbery feel which is most pleasing and appetizing in distinction to the yellowish appearance and surface sliminess which often characterizes pre-cooked pastas. The products are especially suitable for reconstitution in a minute-type preparation to produce an instant pasta or alternatively could be mixed with other dehydrated foods such as vegetables in mixes intended for use as casseroles and the like which require a single addition of water and a simple oven cook for about 45 minutes or less to permit reconstitution of the dried product to an edible consistency. In all of these reconstitution methods the rehydrated products have a texture, mouth feel and other properties similar in all respects to that of ordinary water cooked pasta products. The products of this invention are not puffed or more porous than conventional pasta, but do have a gelatinized structure which allows easy reconstitution with water.

It is understood by those familiar with this art that the high moisture slurry of this invention can include a minor fraction of other liquid or solid constituents. These constituents could be flavor or fortification additives and may include vitamins, spices, meats, vegetables, milk products, and the like.

The invention will now be more specifically described by the following example which shows the use of a high moisture starch slurry to produce a quick-cooking pasta product.

An aqueous slurry was prepared by mixing together 3.3 lbs. of ordinary commercial granular durum wheat with 6.6 lbs. of water in a conventional rotary drum mixer to give a slurry having a solids starch content of 30% and a moisture content of 70%, the 70% moisture content of the slurry being substantially equal to the moisture content required to reconstitute the final product to an edible consistency. A conventional Hartig plastic extruder was preheated to give a barrel section temperature of about 200° F. and the die orifice thereof was heated to about 185° F. to achieve a minimum resident cooking time for the starch slurry equal to that possible in continuous pasta production. The preheated rectangular die orifice was adjusted to a suitable thickness for macaroni noodles of about 0.050 inch and an ordinary room temperature cooling bath of water was placed immediately outside the die orifice with a conventional conveyer belt being used to transport the extruded strip to a cutter mechanism. The high moisture slurry charge was introduced into the extruding and cooking chamber by means of a conventional hopper similar to that used for a charge of dry plastic powder. The starch slurry was cooked for about 2 minutes to gelatinize the starch molecules and then extruded at a rate of about 50 grams per minute into the cooling bath to surface cool the viscous and sticky gel strip to about 60° to 80° F. and thus make the extruded strip easy to handle during further processing to more stable form.

The extruded and cooled gel had a thickness of about 0.050 inch. The gelled pasta strip had a flexure and feel similar to conventional water-cooked pasta as it issued from the cooling bath and was easily cut into noodle sections of about 2 inches in length, which retained their identity on cutting. The cut noodles were placed on stainless steel wire screens in the conventional mono-layer fashion for air drying at a moderate temperature of 100° F. dry bulb and 80° F. wet bulb for 12 hours to reduce the moisture content of the pasta products to about 10 to 14%. The noodle thickness was reduced to 0.020 inch while drying. The dried product was rather brittle and had an opaque, somewhat glassy, yellow texture similar to ordinary precooked, dry pasta noodles.

The dried products were reconstituted to a thickness of 0.050 inch in an excess of boiling water in about 4 minutes to give a final product having taste, texture, and mouth feel similar in all respects to the household water-cooked pasta noodles. A similar final product was produced in about 5 minutes by reconstituting the dried products in a minute-type preparation wherein the noodles were placed in a pot of boiling water which was then covered and removed from its heat source.

It can be seen that the improved process of this invention, which eliminates the need for bulky and expensive machinery thereby accomplishing a substantial saving in production costs, offers the possibility of greatly expanding the consumer market for pre-cooked pasta products, especially in view of the desirable characteristics of the product itself.

While the invention has been described by reference to one specific example, this invention is not intended to be limited thereto except by the limitations in the appended claims.

What is claimed is:

1. A process for the manufacture of a precooked pasta adapted to be reconstituted in water which comprises preparing a slurry of water and particulate ungelatinized starch-containing solids, the water content of said slurry being 60% to 85% by weight, distributing the solids throughout the water to give a substantially homogeneous slurry, heating said slurry to a temperature of 140° F.– 212° F. to gelatinize the starch and form a hydrated plastic gel of adhering starch granules, shaping said plastic gel into a form suitable for further processing, cooling the shaped starch gel to below at least 80° F. to set it in said form, and further processing the cooled and shaped starch gel to a reduced stable moisture content.

2. The process of claim 1 wherein said slurry is 68 to 74% by weight water and the gelatinization temperature is about 180° to 205° F.

3. The process of claim 1 wherein the water content of said slurry is about 70% by weight water, the gelatinization temperature is about 180° to 205° F., and the further processing to reduced stable moisture content includes air drying at a temperature below 200° F.

References Cited in the file of this patent

UNITED STATES PATENTS

| | | |
|---|---|---|
| 1,925,267 | McKay | Sept. 5, 1933 |
| 2,677,613 | Shiah | May 4, 1954 |

OTHER REFERENCES

LeClerc: Cereal Chemistry, Sept. 1933, vol. X, No. 5, pp. 398 and 402–409.

UNITED STATES PATENT OFFICE
CERTIFICATE OF CORRECTION

Patent No. 3,138,462            June 23, 1964

Saul N. Katz et al.

It is hereby certified that error appears in the above numbered patent requiring correction and that the said Letters Patent should read as corrected below.

Column 3, line 12, for "800° F." read -- 200° F. --.

Signed and sealed this 10th day of November 1964.

(SEAL)
Attest:

ERNEST W. SWIDER            EDWARD J. BRENNER
Attesting Officer            Commissioner of Patents